(12) United States Patent
Alexander, III et al.

(10) Patent No.: US 6,851,109 B1
(45) Date of Patent: Feb. 1, 2005

(54) PROCESS AND SYSTEM FOR DYNAMICALLY COMPILING A PARTIALLY INTERPRETED METHOD

(75) Inventors: William Presten Alexander, III, Austin, TX (US); Weiming Gu, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 787 days.

(21) Appl. No.: 09/306,190

(22) Filed: May 6, 1999

(51) Int. Cl.$^7$ ................................................ G06F 9/45
(52) U.S. Cl. ...................... 717/148; 717/118; 717/159
(58) Field of Search .................. 717/106–119, 140–161

(56) References Cited

U.S. PATENT DOCUMENTS 6,131,191 A * 10/2000 Cierniak et al. ............... 717/10
6,151,703 A * 11/2000 Crelier ............................ 717/5

OTHER PUBLICATIONS

Java.sun.com, A white page, "The Java HotSpot™ Performance Engine Architecture", Sun Microsystems Inc., pp. 1–13, Apr. 1999.*
Kazi et al., "Techniques for Obtaining High Performance in Java Programs", ACM, pp. 213–240, Sep. 2000.*
Hsieh et al., "Optimizing NET Compilers for improved Java Performance", IEEE, pp. 67–75, Jun. 1997.*
Dean et al., "Vortex: An Optimizing Complier for Object-Oriented Languages", ACM, pp. 83–100, Oct. 1996.*
Burke et al., "The Jalapeño dynamic optimizing compiler for Java™", ACM, pp. 129–141, Jun. 1999.*
Hsieh et al., " Java Bytecode to Native Code Translation: The Caffeine Prototype and Preliminary Results", IEEE, pp. 90–97, Dec. 1996.*
Aho et al., "Compilers Principles, Techniques and Tools", chapter seven, Addison–Wesley Publishing, pp.: 424–429, 1986.*
White Paper, "The Java Hotspot™ Performance Engine Architecture," Sun Microsystems, Inc., Apr. 1999.*

* cited by examiner

*Primary Examiner*—Tuan Dam
*Assistant Examiner*—Ted T. Vo
(74) *Attorney, Agent, or Firm*—Duke W. Yee; Jeffrey S. LaBaw; Stephen J. Walder, Jr.

(57) ABSTRACT

A process and system for dynamically compiling a partially interpreted method is provided. A set of bytecodes for a method is interpreted within a virtual machine. During the interpretation of the method, it is determined, according to the satisfaction of predetermined criteria, that the method contains an execution hot spot and should be just-in-time compiled (JITed) in order to increase the processing speed of the method. The interpretation of the method is halted with a halted execution state and at a halted execution location. Another method is constructed using information from the partially interpreted method and its execution state. The newly constructed method is just-in-time compiled and invoked in such a manner that the newly constructed method recreates the execution state of the partially interpreted method. Once the newly constructed method recreates the execution state of the partially interpreted method, the execution flow follows the bytecode sequence of the partially interpreted method.

24 Claims, 8 Drawing Sheets

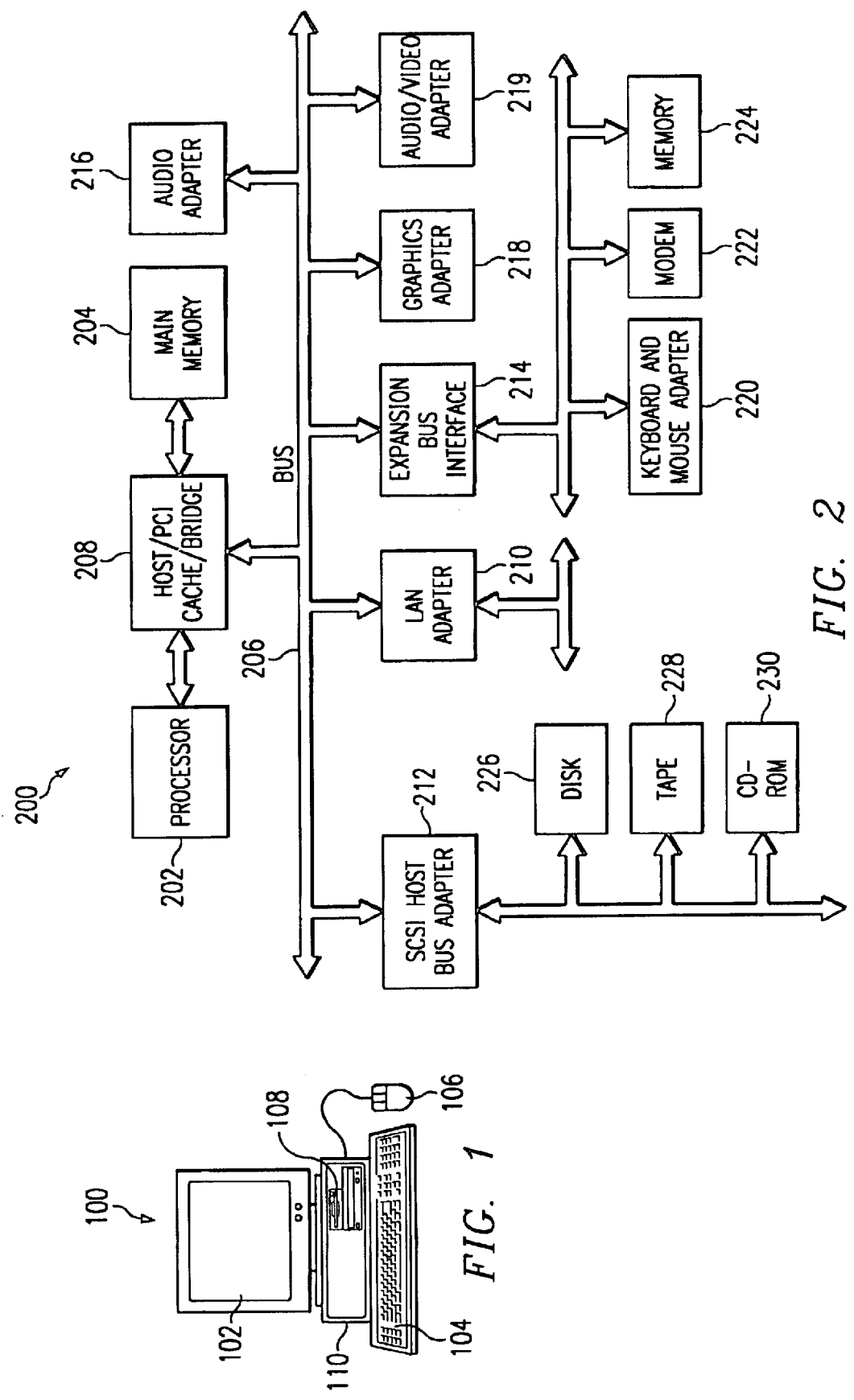

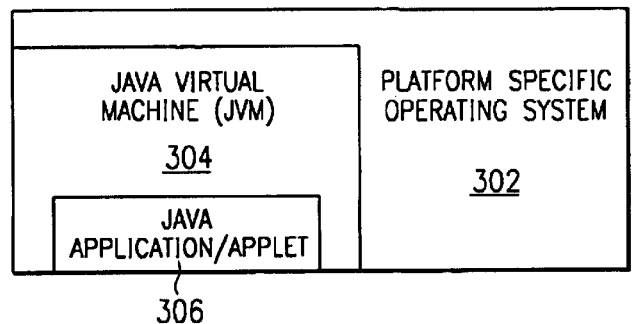
FIG. 3
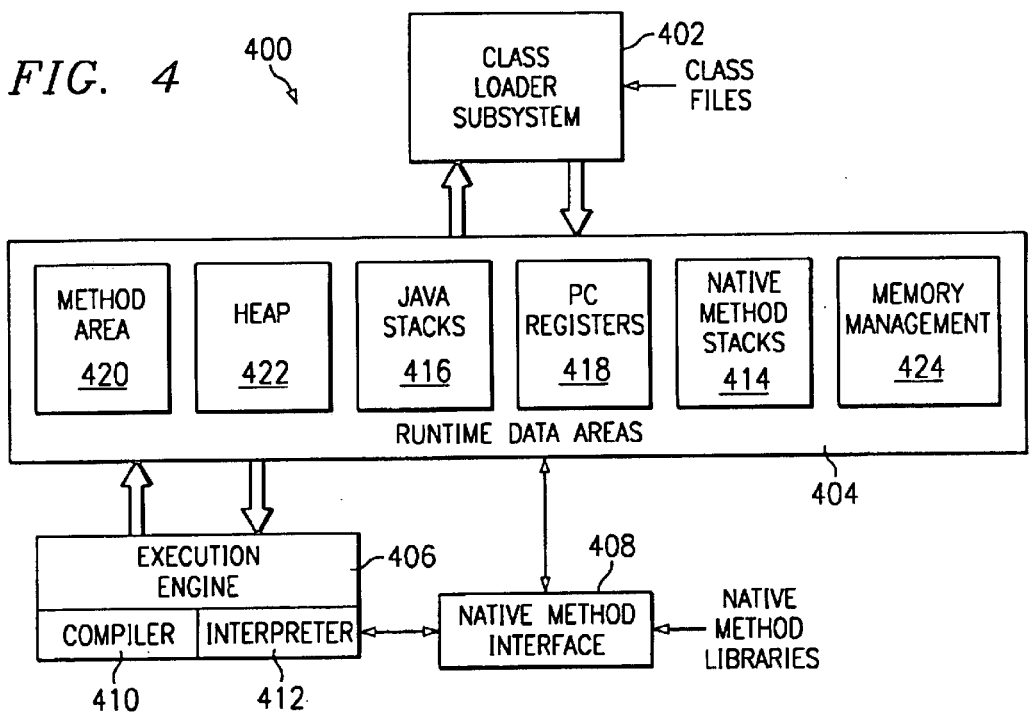
FIG. 4
```
class Figure6A {
    public int Figure6method1(boolean byte1, char char1, double double1, short short1) {
        return 0;
    }
    public static int Figure6method2(byte byte2, double double2, float float2, Object object2,
int integer2, long long2) {
        return 0;
    }
}
```
FIG. 6A

FIG. 7A

```
iload_0    // push the int in local variable 0
iload_1    // push the int in local variable 1
iadd       // pop two ints, add them, push result
istore_2   // pop int, store into local variable 2
```

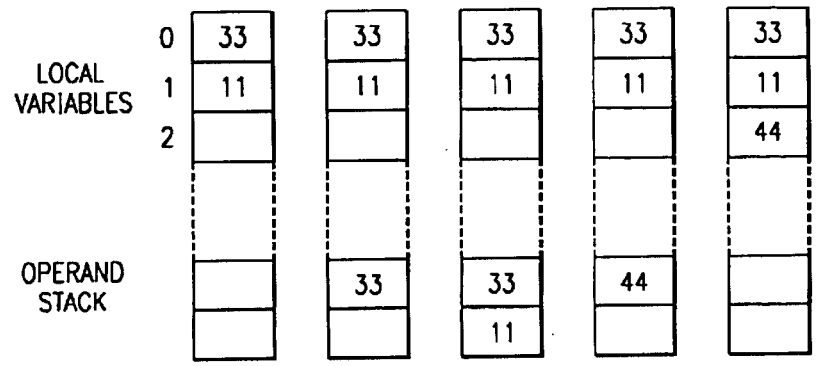

| OPCODE | OPERAND | DESCRIPTION |
|---|---|---|
| nop | none | DO NOTHING |
| pop | none | POPS THE TOP WORD FROM THE OPERAND STACK |
| pop2 | none | POPS THE TOP TWO WORDS FROM THE OPERAND STACK |
| swap | none | SWAPS THE TOP OPERAND STACK TWO WORDS |
| dup | none | DUPLICATES TOP OPERAND STACK WORD |
| dup2 | none | DUPLICATES TOP TWO OPERAND STACK WORDS |
| iload_0 | none | PUSHES INT FROM LOCAL VARIABLE POSITION ZERO |
| iload_1 | none | PUSHES INT FROM LOCAL VARIABLE POSITION ONE |
| fload | vindex | PUSHES FLOAT FROM LOCAL VARIABLE POSITION SPECIFIED BY BYTE FOLLOWING OPCODE |
| fload_2 | none | PUSHES FLOAT FROM LOCAL VARIABLE POSITION TWO |
| fload_3 | none | PUSHES FLOAT FROM LOCAL VARIABLE POSITION THREE |
| lload_0 | none | PUSHES LONG FROM LOCAL VARIABLE POSITION ZERO AND ONE |
| lload_1 | none | PUSHES LONG FROM LOCAL VARIABLE POSITION ONE AND TWO |
| dload_3 | none | PUSHES DOUBLE FROM LOCAL VARIABLE POSITIONS THREE AND FOUR |
| aload | vindex | PUSHES OBJECT REFERENCE FROM POSITION SPECIFIED BY BYTE FOLLOWING OPCODE |
| istore | vindex | POPS INT TO LOCAL VARIABLE POSITION SPECIFIED BY BYTE FOLLOWING OPCODE |
| istore_0 | none | POPS INT TO LOCAL VARIABLE POSITION ZERO |
| fstore | vindex | POPS FLOAT TO LOCAL VARIABLE POSITION SPECIFIED BY BYTE FOLLOWING OPCODE |
| fstore_2 | none | POPS FLOAT TO LOCAL VARIABLE POSITION TWO |

```
         oldMethod:        ; entry point for method "oldMethod"

bytecode 1        ; first bytecode of oldMethod
         bytecode 2        ; second bytecode of oldMethod
            ·              ; other bytecodes
            ·
            ·
         label_i:          ; starting label for long-running loop
900      bytecode i        ; first bytecode after loop label
     902 bytecode i+1      ; second bytecode after loop label
            ·
            · 904
            ·
         loop label_i      ; bytecode for returning to beginning of long-running loop
            ·
            ·
            ·
         return            ; exit from method "oldMethod"
```

*FIG. 9*

```
         newMethod:        ; entry point for method "newMethod"
    1006
         bytecodes X       ; bytecodes to produce stack frame state "S"
         goto label_i      ; bytecode to begin execution of previously suspended location
    1008
         bytecode 1        ; first bytecode of oldMethod
         bytecode 2        ; second bytecode of oldMethod
            ·              ; other bytecodes
            ·
            ·
1000     label_i:          ; starting label for long-running loop
         bytecode i        ; first bytecode after loop label
    1002 bytecode i+1      ; second bytecode after loop label
            ·
            · 1004
            ·
         loop label_i      ; bytecode for returning to beginning of long-running loop
            ·
            ·
            ·
         return            ; exit from method "newMethod"
```

*FIG. 10A*

```
              newMethod:         ; entry point for method "newMethod"
    1010
         Xload S_0               ; bytecode for loading first stack value from previous method
         Xload S_1               ; bytecode for loading second stack value from previous method
    1012    ○
             ○
             ○
         Xload S_{M-1}           ; bytecode for loading Mth stack value from previous method
    1014
         goto label_i            ; bytecode to begin execution of previously suspended location bytecode 1              ; first bytecode of oldMethod
         bytecode 2              ; second bytecode of oldMethod
1000         ○                   ; other bytecodes
             ○
             ○
           label_i:              ; starting label for long-running loop
           bytecode i            ; first bytecode after loop label
           bytecode i+1          ; second bytecode after loop label
    1002         1004
             ○
             ○
             ○
           loop label_i          ; bytecode for returning to beginning of long-running loop
             ○
             ○
             ○
           return                ; exit from method "newMethod"
```

FIG. 10B

FIG. 11A
```
public int Figure11oldMethod(int arg0, int arg1) {
    ...
}
```

FIG. 11B
```
    ○
    ○
    ○
var1 = Figure11oldMethod(13, 11);
    ○
    ○
    ○
```

FIG. 11C
```
public int Figure11newMethod(int arg1, int arg2, int
        localVar0, int localVar1, int localVar2, int localVar3,
        int localVar4, int stack0, int stack1, int stack2) {
    ...
}
```

FIG. 11D
```
Invoke +++> Figure11newMethod(13, 11, 1, 7, 3,
                              23, 17, 1, 5, 2)
```

PROCESS AND SYSTEM FOR DYNAMICALLY COMPILING A PARTIALLY INTERPRETED METHOD

CROSS REFERENCE TO RELATED APPLICATIONS

The present invention is related to application entitled Method and Apparatus For Partial Just In Time Compiling in a Data Processing System, Ser. No. 09/303,106, assigned to the same assignee, and incorporated herein by reference.

BACKGROUND OF THE INVENTION

1. Technical Field

The present invention relates generally to an improved data processing system and, in particular, to a process and system for dynamically compiling a program.

2. Description of Related Art

Since Java is an interpreted language, any programs written in Java, after being converted into Java class files, are interpreted by a Java virtual machine (JVM). In order to improve performance, many JVMs may compile Java classes into platform-specific binary code after they are loaded into the JVM. Then, instead of being interpreted, Java classes are executed in their compiled native code format, similar to programs written in other languages, such as C, C++, etc. Such just-in-time (JIT) compilation of Java programs can significantly improve the speed of execution of Java programs.

In some early implementations of JIT compilers, JIT compilation is enabled for every method loaded into the JVM for all Java applications. However, the just-in-time compilation time becomes part of the execution time of a Java program. For a given Java class method, JIT compilation can be justified only if the compiled method code executes in less time than the JIT compilation time for the method. Otherwise, the method should be executed by interpreting the method's bytecodes. For typical Java applications, there are many class methods which are only rarely invoked, making JIT compilation of such methods unjustified. As a result, on JVMs with early JIT compilers, loading Java applications with JIT compilation enabled is typically slower than loading the same Java applications with interpretation only (JIT compilation disabled). This is mainly due to the fact that during the Java application loading time, a large number of class methods are invoked relatively few times, making their JIT compilation times unjustified.

In more advanced JVM implementations, JIT compilers compile Java methods selectively, depending on the frequency with which the methods are invoked. This so-called "hot-spot compiling" is a hybrid of interpreting and just-in-time compiling that attempts to combine both techniques in order to yield Java programs that run as fast as natively compiled code. This type of execution may be performed by an interpreter in the execution engine called a "mixed mode interpreter." A mixed-mode interpreter attempts to analyze or profile the execution of the program in order to determine the locations of the program that justify the time expense for compiling a portion of the program.

The usual approach to optimization is to profile the program to discover exactly where the program spends most of its time and then spend time optimizing portions of the program which execute most often. A Java virtual machine (JVM) that performs hot-spot compiling attempts to optimize only the time-critical portions of a program. In this approach, the JVM begins the execution of the program by interpreting the program. As the JVM interprets the program's bytecodes, it analyzes the execution of the program to determine the program's "hot spots," which is the part of the program where the program spends most of its time. When it identifies a hot spot, the JVM just-in-time compiles only the portion of the code that encompasses the hot spot.

As the program continues to run, the JVM continues to analyze the program. If another hot spot is revealed, the JVM can just-in-time compile and optimize new areas. Also, the JVM can revert back to using bytecodes for areas that no longer seem time-critical in order to keep the memory footprint at a minimum. Depending upon the host platform, a smaller memory footprint may make the difference between a program fitting or not fitting in memory.

It is important to note that the unit of Java program being JIT compiled or interpreted is whole Java methods. That is, a Java method is either entirely JIT compiled or interpreted in a JVM. Typically, mixed-mode interpreters allow each Java method to be interpreted for a number of times before it is compiled. In one previous solution, each method has an associated invocation counter that is decremented whenever the method is invoked and also when backward branches are encountered. When the counter reaches zero, the associated method is compiled at its next invocation, and subsequent invocations for the method use the compiled code.

A major disadvantage of this solution is that it causes low performance for Java methods with very long running loops. For example, a daemon thread may use an "infinite" or essentially non-terminating loop to handle almost all of its work. Once the daemon thread enters the method, it may never exit. In this extreme but not so uncommon case, the method would be continually interpreted because the daemon thread may never return from the method so that it can be just-in-time compiled (or JITed). As a result, the daemon thread spends all its time in the interpretation mode, even though the method is already determined to be a "hot spot" and is a candidate for JIT compilation.

Therefore, in order to improve the performance of certain Java programs, it would be particularly advantageous to provide a mixed-mode interpreter with the ability to improve the performance of a program with particular types of "hot spots," such as methods with essentially non-terminating loops.

SUMMARY OF THE INVENTION

The present invention provides a process and system for dynamically compiling a partially interpreted method. A set of bytecodes for a method is interpreted within a virtual machine. During the interpretation of the method, it is determined, according to the satisfaction of predetermined criteria, that the method contains an execution hot spot and should be just-in-time compiled (JITed) in order to increase the processing speed of the method. The interpretation of the method is halted with a halted execution state and at a halted execution location. Another method is constructed using information from the partially interpreted method and its execution state. The newly constructed method is just-in-time compiled and invoked in such a manner that the newly constructed method recreates the execution state of the partially interpreted method. Once the newly constructed method recreates the execution state of the partially interpreted method, the execution flow follows the bytecode sequence of the partially interpreted method.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation depicting a data processing system in which the present invention may be implemented in accordance with a preferred embodiment of the present invention;

FIG. 2 is a block diagram illustrating internal components of a data processing system that may implement the present invention;

FIG. 3 is a block diagram illustrating the relationship of software components operating within a computer system that may implement the present invention;

FIG. 4 depicts a block diagram of a Java virtual machine in accordance with a preferred embodiment of the present invention;

FIG. 5 is a block diagram depicting the memory areas that the JVM creates for each thread;

FIGS. 6A–6B show examples of Java source code and its effects on Java stack frames;

FIGS. 7A–7B show an example of the manner in which a Java virtual machine adds two local variables;

FIG. 8 is a list describing some of the Java instructions that may be used to manipulate the stack;

FIG. 9 is a diagram depicting pseudo-bytecode, an example of a Java method that is a candidate for the optimization process of the present invention;

FIGS. 10A–10B are diagrams depicting, in pseudo-bytecode, an example of a Java method that replaces a partially executed method that is being optimized by the process of the present invention;

FIGS. 11A–11E are diagrams depicting examples of a partially interpreted Java method that is being optimized by the process of the present invention.

DETAILED DESCRIPTION OF THE PREFERRED EMBODIMENT

Figures 5, 6B:
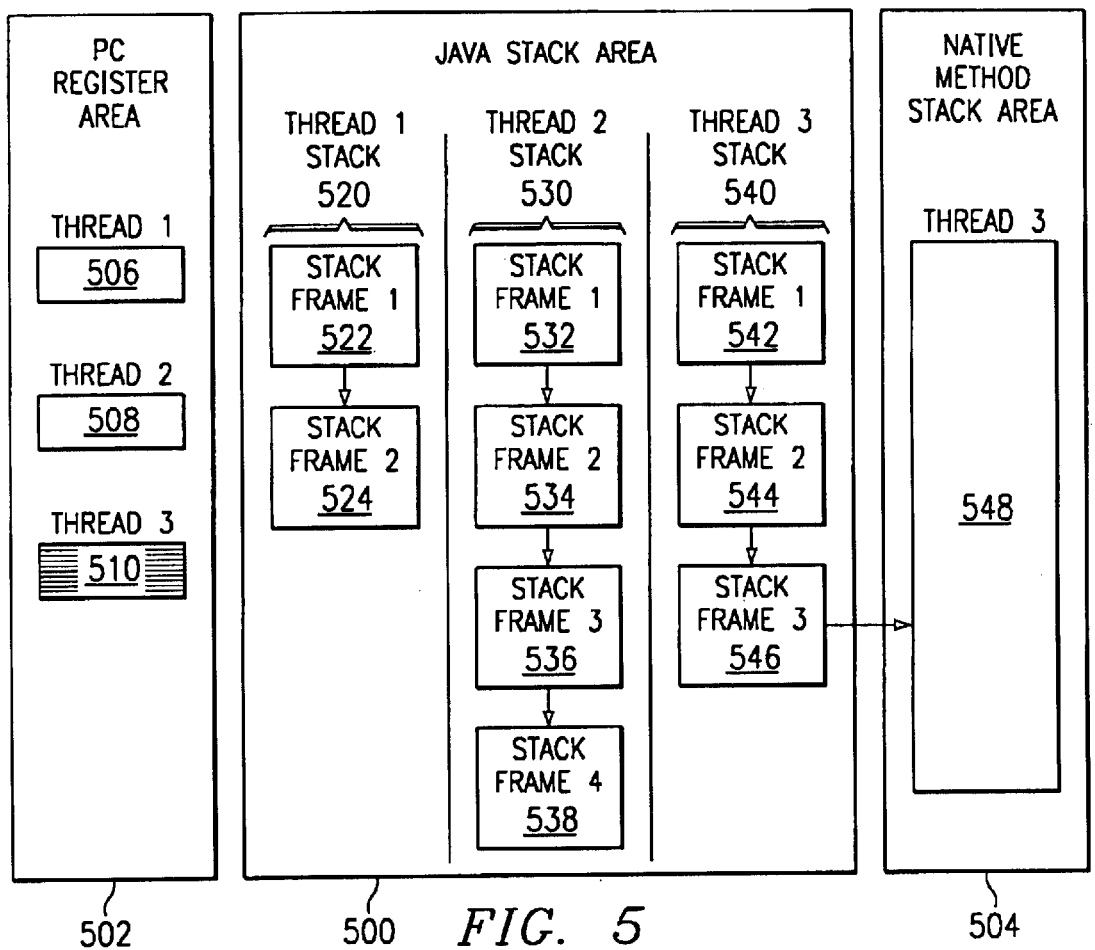

With reference now to FIG. 1, a pictorial representation depicts a data processing system in which the present invention may be implemented in accordance with a preferred embodiment of the present invention. A personal computer 100 is depicted, which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of system software residing in computer readable media in operation within computer 100.

With reference now to FIG. 2, a block diagram illustrates internal components of a data processing system that may implement the present invention. Data processing system 200 is an example of a personal computer, such as computer 100 in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

Other examples for data processing system 200 include an Internet information appliance for surfing the Internet and the World Wide Web. Internet information appliances may include Web-based interactive television set-top boxes. The depicted example in FIG. 2 and above-described examples are not meant to imply architectural limitations.

With reference now to FIG. 3, a block diagram illustrates the relationship of software components operating within a computer system that may implement the present invention. Java-based system 300 contains platform specific operating system 302 that provides hardware and system support to software executing on a specific hardware platform. Java Virtual Machine (JVM) 304 is one software application that may execute in conjunction with the operating system. JVM 304 provides a; Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core.

The present invention provides a method and apparatus for dynamically compiling a Java method that has been partially executed through interpretation. Hence, the present invention operates in conjunction with a Java virtual machine yet within the boundaries of a JVM as defined by Java standard specifications. In order to properly present the present invention, portions of the operation of a Java virtual machine according to Java specifications are herein described.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

A JVM must load class files and execute the bytecodes within them. The Java virtual machine contains a class loader, which loads class files from an application and the class files from the Java application programming interfaces (APIs) which are needed by the application. The execution engine that executes the bytecodes may vary across platforms and implementations.

The simplest type of software-based execution engine is a just-in-time compiler. With this type of execution, the bytecodes of a method are compiled to native machine code upon the first invocation of the method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java run-time environment may have two kinds of methods: Java and native. A Java method is written in the Java language, compiled to bytecodes, and stored in class files. A native method is written in Java or some other language and compiled to the native machine code of a particular processor. Native methods are stored in a dynamically linked library whose exact form is platform specific.

With reference now to FIG. 4, a block diagram of a Java virtual machine is depicted in accordance with a preferred embodiment of the present invention. Java virtual machine (JVM) 400 includes a class loader subsystem 402, which is a mechanism for loading types, such as classes and interfaces, given fully qualified names. JVM 400 also contains runtime data areas 404, execution engine 406, native method interface 408, and memory management 424. Execution engine 406 is a mechanism for executing instructions contained in the methods of classes loaded by class loader subsystem 402. Execution engine 406 may be, for example, Java interpreter 412 or just-in-time compiler 410. Native method interface 408 allows access to resources in the underlying operating system. Native method interface 408 may be, for example, a Java native interface.

Runtime data areas 404 contain native method stacks 414, Java stacks 416, PC registers 418, method area 420, and heap 422. These different data areas represent the organization of memory needed by JVM 400 to execute a program.

Java stacks 416 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. A JVM does not have any registers for holding intermediate values; any Java instruction that requires or produces an intermediate value uses the stack for holding the intermediate values. In this manner, the Java instruction set is well-defined for a variety of platform architectures.

PC registers 418 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 414 store the state of invocations of native methods. The state of native method invocations is stored in an implementation-dependent way in native method stacks, registers, or other implementation-dependent memory areas.

Method area 420 contains class data while heap 422 contains all instantiated objects. The JVM specification strictly defines data types and operations. The data types can be divided into a set of primitive types and a reference type. Reference values refer to objects, but primitive values are actual data. All the primitive types of the Java programming language, except "boolean", are primitive types of a JVM. In a manner similar to the C language, "booleans" are represented by an "int" or "byte" in compiled Java bytecodes, with "false" represented by integer zero and "true" by any nonzero integer. All primitive types of the Java programming language other than "boolean" are numeric types of the JVM. Numeric types include the integral types "byte", "short", "int", "long", "char", and the floating-point types "float" and "double". As with the Java programming language, primitive types of the JVM always have the same possible range of values. A "long" in the JVM always acts like a 64-bit signed two's-complement number, independent of the underlying host platform. The JMV has one additional primitive type that is unavailable in the Java programming language—the "returnValue" type. This primitive type implements "finally" clauses of Java programs.

All JVMs have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 422. JVM 400 includes an instruction that allocates memory space within the memory for heap 422 but includes no instruction for freeing that space within the memory. Memory management 424 in the depicted example manages memory space within the memory allocated to heap 420. Memory management 424 may include a garbage collector which automatically reclaims memory used by objects that are no longer referenced by an application. Additionally, a garbage collector also may move objects to reduce heap fragmentation. Memory management 424 also may include an object relocator to relocate objects to a seldom used object store.

With reference now to FIG. 5, a block diagram depicts the memory areas that the JVM creates for each thread. These areas are private to each thread; a thread may not access the pc register or Java stack of another thread.

FIG. 5 shows a snapshot of a moment in which three threads are executing. Java stack area 500 contains the stacks for threads 1-3. Thread 1 stack 520 has stack frames 522 and 524. Thread 2 stack 530 has stack frames 532–538. Thread 3 stack 540 has stack frames 542–546. PC register area 502 has pc registers 506–510 for threads 1–3, respectively. PC register 510 is undefined because thread 3 is executing a native method. Native method stack area 504 has stack 548 for thread 3.

Threads 1 and 2 are executing Java methods while thread 3 is executing a native method. Stacks 520, 530, and 540 grow "downward" in the figure with the top of each stack containing stack frame 1 for each thread. Stack frames 524, 538, and 546 are the stack frames for currently executing methods. A thread's current method is the method that is currently executing. A current method's stack frame is the current frame. The current method's class is the current class, and the current class's constant pool is the current constant pool. As it executes a method, the JVM keeps track of the current class and current constant pool. When the JVM executes a method's instructions for data stored in a stack frame, it performs those operations on the current frame.

When a thread invokes a Java method, the JVM creates and pushes a new frame onto the thread's Java stack. This new frame then becomes the current frame. As the method executes, it uses the frame to store parameters, local variables, intermediate computations, and other data. When a thread invokes a method, the method's local variables are stored in a frame on the invoking thread's Java stack. The only thread that may access these local variables is the thread that invoked the method. A method can complete either normally, i.e. completing execution, or abruptly, i.e. completing by throwing an exception. When a method completes, either normally or abruptly, the JVM pops and discards the completing method's stack frame. The frame for the previous method then becomes the current frame.

Java stack and stack frames do not need to be contiguous in memory. Frames may be allocated on a contiguous stack, on a heap, or both. The Java specification does not specify the actual data structures that implement the Java stack and stack frames.

A stack frame has three parts: local variables, operands, and frame data. The sizes of the local variables and operand portion of the stack frame, which are measured in words, depend on the needs of each individual method. These sizes are determined at compile-time and are included in the class file data for each method. The size of the frame data is implementation-dependent. When the JVM invokes a Java method, it checks the class data to determine the number of words required by the method in the local variables and operand stack. The JVM creates a stack frame of the proper size for the method and pushes the stack frame onto the Java stack.

The local variable section of the Java stack frame is organized as a zero-based array of words. Instructions that use a value from the local variable section provide an index into the zero-based array. Values of type "int", "float", "reference", and "returnValue" occupy one entry in the local variables array. Values of type "byte", "short", and "char" are converted to "int" before being stored into the local variables. Values of type "long" and "double" occupy two consecutive entries in the array.

To refer to a "long" or "double" in the local variables, instructions provide the index of the first of the two consecutive entries occupied by the value. For example, if a "double" occupies array entries five and six, instructions would refer to that "double" by index five. All values in the local variables are word aligned. Dual-entry "longs" and "doubles" can start at any index.

With reference now to FIGS. 6A–6B, examples of Java source code and its effects on Java stack frames are provided. FIG. 6A provides examples of Java programming language source code statements for an instance method and a class method. FIG. 6B depicts the state of a local variables section of a stack frame.

The local variables section contains a method's parameters and local variables. Compilers place the parameters into the local variable array first, in the order in which they are declared. FIG. 6B shows the local variables section for the two methods shown in FIG. 6A.

FIG. 6B shows that the first parameter in the local variables section for an instance method "Figure6Bmethod1( )" is of type "reference", even though no such parameter appears in the source code. This reference is the hidden "this" passed to every instance method. Instance methods use this reference to access the instance data of the object upon which they were invoked. As shown for the local variables for a class method "Figure6Bmethod2( )", class methods do not receive a hidden "this". Class methods are not invoked on objects. A class's instance variables cannot be accessed from a class method because no instance is associated with the method invocation.

Data types "byte", "short", "char", and "boolean" in the source code of FIG. 6A have data type "int" in the local variables and operand portions of the stack. Each is manipulated as an "int" while on the stack frame and then converted back into the proper type when stored in the heap or method area.

All objects are passed by reference, such as "Object Object2" that is passed as a reference to "Figure6Bmethod 2( )". In Java, all objects are passed by reference. Therefore, only object references appear on the stack.

Compilers must place a method's parameters into the local variables array first and in order of declaration. However, Java compilers can arrange the local variables array arbitrarily. Compilers can place the method's local variables into the array in any order, and they can use the same array entry for more than one local variable. For example, if two local variables have limited scopes that do not overlap, compilers are free to use the same array entry for both variables. As with all the other runtime memory areas, implementation designers can use whatever data structures they deem most appropriate to represent the local variables. The JVM specification does not indicate how "longs" and "doubles" should be split across the two array entries they occupy. Implementations that use a word size of 64 bits could, for example, store an entire "long" or "double" in the lower of the two consecutive entries, leaving the higher entry unused.

Like the local variables, the operand stack is organized as an array of words. But unlike the local variables, which are accessed via array indices, the operand stack is accessed by pushing and popping values. If an instruction pushes a value onto the operand stack, a later instruction can pop and use that value. The virtual machine stores the same data types in the operand stack that it stores in the local variables: "int", "long", "float", "double", "reference", and "returnType". It converts values of type "byte", "short", and "char" to "int" before pushing them onto the operand stack.

Other than the program counter, which cannot be directly accessed by instructions, the JVM has no registers. The JVM is stack-based rather than register-based because its instructions take their operands from the operand stack rather than from registers. Instructions can also take operands from other places, such as immediately following the opcode in the bytecode stream or from the constant pool. The JVM instruction set's main focus of attention, however, is the operand stack.

With reference now to FIGS. 7A–7B, an example is provided for the manner in which a Java virtual machine adds two local variables that contain two integers of type "int", and store the "int" result in a third local variable.

The JVM uses the operand stack as a workspace. Many instructions pop values from the operand stack, operate on them and push the result. For example, the "iadd" instruction adds two integers by popping two values of type "int" off the top of the operand stack, adding them and pushing the "int" result.

As shown in the example bytecodes in FIG. 7A, two instructions, iload_0 and iload_1, push the "ints" stored local variable position zero and one onto the operand stack. The "iadd" instruction pops those two "int" values, adds them and pushes the "int" result back onto the operand stack. The fourth instruction, istore_2, pops the result of the add off the top of the operand stack and stores it into local variable position two.

FIG. 7B is a graphical depiction of the state of the local variables and operand stack while executing the instructions of FIG. 7A. In FIG. 7B, unused slots of the local variables and operand stack are left blank.

In addition to the local variables and operand stack, the Java stack frame has a frame data portion that includes data to support the operation of the JVM with respect to the method: a pointer to the constant pool, normal method return, and the dispatch of exceptions. The stack frame may also include other information that is implementation-dependent, such as data to support debugging.

Many instructions in the JVM's instruction set refer to entries in the constant pool. Whenever the JVM encounters any of the instructions that refer to an entry in the constant pool, it uses the frame data's pointer to the constant pool to access that information. References to types, fields and methods in the constant pool are initially symbolic. When the JVM looks up a constant pool entry that refers to a class, interface, field or method, that "reference" may still be symbolic. If so, the JVM must resolve the "reference" at that time.

The frame data must assist the JVM in processing a normal or abrupt method completion. If a method completes normally by returning, the JVM must restore the stack frame of the invoking method. It must set the pc register to point to the instruction in the invoking method. If the completing method returns a value, the JVM must push that value onto the operand stack of the invoking method.

The frame data must also contain some kind of reference to the method's exception table, which the JVM uses to process any exceptions thrown during the course of execution of the method. An exception table defines ranges within the bytecodes of a method that are protected by catch clauses. Each entry in an exception table gives a starting and ending position of the range protected by a catch clause, an index into the constant pool that gives the exception class being caught, and a starting position of the catch clause's code. When a method throws an exception, the Java virtual machine uses the exception table referred to by the frame data to determine how to handle the exception. If the virtual machine finds a matching catch clause, the method completes abnormally. The virtual machine uses the information in the frame data to restore the invoking method's frame and then rethrows the same exception in the context of the invoking method.

With reference now to FIG. 8, a list describes some of the Java instructions that may be used to manipulate the stack. Although most instructions operate on a particular type, some instructions are generic, typeless instructions. Several opcodes push "int" and "float" local variables onto the operand stack. Some opcodes implicitly refer to a commonly used local variable position. For example, "fload_1" loads the "float" local variable at position one. Instructions for "long" and "double" move two words from the local variable section of the stack frame to the operand stack section. Other opcodes push local variables to move object references (which occupy one word) from the local variables section of the stack frame to the operand section. For each opcode that pushes a local variable onto the stack, a corresponding opcode exists that pops the top of the stack back into the local variable. The names of the pop opcodes can be formed from the names of the push opcodes by replacing "load" with "store."

The present invention provides a method and apparatus for dynamically compiling a Java method that has been partially executed through interpretation. As noted previously, a mixed-mode interpreter allows a Java method to be interpreted a number of times before it is compiled; it stops a partially interpreted Java method, compiles it, and then resumes execution of the compiled code.

The interpreter of the present invention is a mixed-mode interpreter that attempts to find particular "hot spots" that include methods with long-running loops. To improve the performance of methods with long-running loops, essentially non-terminating loops, or infinite loops, a new method is constructed and just-in-time compiled (JITed) that "replaces" the previous, partially executed, interpreted method. The newly constructed method is similar to the previous method because the exact execution state of the running thread is reproduced in the JITed version of the method. However, the new JITed_method has extra code placed at the beginning of the method that recreates the exact execution state of the previous, partially executed, interpreted method. Once the new method is JITed and its execution is initiated, then the method achieves the same execution state as before the interpreter attempted to optimize the "hot spot" of the method. One important advantage of the present invention is that it optimizes a "hot spot" without changes to the JIT compiler; any other JIT optimizations may still be applied to the new method as well as the original method.

With reference now to FIG. 9, a diagram depicts, in pseudo-bytecode, an example of a Java method that is a candidate for the optimization process of the present invention. Method 900, named "oldMethod", contains long-running loop 902. For simplicity, it may be assumed that only one thread is executing method 900 when the interpreter attempts to JIT the method.

In the interpretation mode, the interpreter maintains an invocation counter for each method that is initialized to some predetermined but possibly variable value. An invocation counter is decremented with each invocation of the method and with each backward branch within the method. A backward branch is any of several Java bytecodes specifying a conditional or unconditional jump, where the destination address (called the target) is lower than the address of the jump instruction itself. Each iteration of loop 902 contains a backward branch that causes the method's invocation counter to be decremented. At some point in time after long-running loop 902 has been executed many times, the invocation counter reaches zero. It is determined that loop 902 is a long-running loop, and method 900 becomes eligible to be JITed, i.e. the interpreter should stop interpretation and JIT the method. In this case, the interpreter stops interpretation just before interpreting the target of the backward jump, i.e. statement 904, which is labeled "label_i."

At the point at which the interpreter determines to JIT the method containing the long-running loop, the interpreter can be viewed as a state machine that is in some state of execution for the interpreted method. There are four parts to the state of the method: the configuration of operands on its Java stack frame—state variables "S"; the values of its local variables—state variables "V"; the location of the looping label that causes the backward branch—state variable "L", and any monitors held—state variable "M". The state of the method may be denoted as methodState(S, V, L, M).

The present invention constructs a new method based on the original method, and the new method has the following execution characteristics: (a) the execution of the new method always reaches the location of the looping label that causes the backward branch; (b) when the execution of the new method first reaches the location of the looping label that causes the backward branch, methodState(S, V, L, M) must be reproduced exactly; and (c) once the new method reaches the location of the looping label that causes the backward branch, the execution flow follows the original bytecode sequence of the original method that was JITed. Each of these requirements is achieved as explained further below.

The current stack frame contains most of the information necessary for constructing the current method's execution state—methodState(S, V, L, M). Among other things, it contains some X operand items ($S_0$, $S_1$, $S_2$, ... $S_{x-1}$) and some Y local variables ($V_0$, $V_1$, $V_2$, ... $V_{Y-1}$). Note that either $S_i$, or $V_i$ may contain an object reference, including an array or data of some scalar type, such as boolean, byte, short, char, int, long, float, or double. The format of the new stack frame for the compiled method may be different than the previous stack frame for the interpreted method, but with the previous stack frame and the information in the method itself, the new frame can be constructed.

It should be noted that, in the new frame, all local variables will be method arguments. The method of the present invention is possible given the fact that the JVM is stack-based rather than register-based. Because all of the local variables and all of the method arguments are stored in the method's stack frame, the location of the data within the stack frame may be manipulated to achieve the optimization of JITing a long-running loop.

The JVM treats method arguments similarly to the manner in which it treats local variables within the method. Method arguments are local variables (0, 1, ... i) in the stack frame, and local variables declared inside the method are numbered (i+1, ... , y). Hence, if the process of the present invention adds arguments (i+1, ... , y) to the signature of the newly constructed method and invokes it with the values that the local variables had at the moment that the interpreter stopped interpretation of the original method, the instructions dealing with local variables that were present in the original method can be kept unchanged. In other words, since the stack frame indices for the added arguments of the newly constructed method are identical to the stack frame indices of the local variables for the interpreted method, the instructions within the body of the method that access the local variables do not need to be changed.

The process of adding the previous local variables as arguments to the signature of the newly constructed method provides a mechanism for ensuring that the values of its local variables, state variables "V" in methodState(S, V, L, M), are preserved between the previously interpreted method and the newly constructed method.

With reference now to FIGS. 10A–10B, a diagram depicts, in pseudo-bytecode, an example of a Java method that replaces a partially executed method that is being optimized by the process of the present invention. FIG. 10A has method 1000, named newMethod, that contains long-running loop 1002. Method 1000 is an example of a method constructed according to the process of the present invention. Method 1000 may replace method 900 that is being JITed in order to optimize the "hot spot" of long-running loop 902. The newly created method also has the backward jump of the long-running loop, i.e. statement 1004, whose target is "label_i."

Method 900 in FIG. 9 has a signature in which a certain number and type of parameters were passed to the method. The signature of method 1000 has at least the same number and type of parameters as method 900, but the signature of method 1000 is extended by adding to its argument list all of the local variables in method 900 that were not arguments originally. Method 1000 is then invoked with the values of the local variables in method 900 at the time of the suspension of the execution of method 900, i.e. at the time that the interpreter determined to JIT the previous method.

At the beginning of method 1000, which is the newly constructed method, bytecodes 1006 are added to reproduce exactly the state of the Java stack frame. Bytecode 1008, which is a "goto" bytecode instruction, is then inserted to jump to "label_i", the point at which execution in method 900, named oldMethod, was stopped. The other original bytecodes from method 900 follow the newly inserted "goto" bytecode 1008. The bytecodes following the first "goto" are identical to those in the original method. Exception ranges may have to be adjusted to account for the extra instructions at the beginning of the method.

FIG. 10A shows a process for restoring the stack in a general manner but does not fully explain the manner in which the exact stack state "S" may be restored. However, the newly constructed method does show a mechanism for ensuring that the location of the looping label that causes the backward branch, state variable "L" in methodState(S, V, L, M), is preserved between the previous interpreted method and the newly constructed method. By ensuring that the bytecodes between the loop instruction and the looping label maintain the same relationship, i.e. no bytecodes have been inserted or deleted or changed within the long-running loop, the long-running loop will continue to execute as expected, provided that the remainder of the methodState may be achieved.

In order to reproduce the exact state, i.e. the configuration of the Java stack frame—state variable "S", of the Java stack frame for the newly constructed method from the previously interpreted method, bytecodes are added at the beginning of the new method to push any other values onto the stack that were present on the stack when the interpreter stopped interpreting the method. Preferably, instructions would be placed into the method that load the appropriate values onto the stack with so-called "immediate data", i.e. data that is stored immediately following the instructions that operate on the immediate data. Since there are no bytecodes for directly pushing values other than "char" and "short" onto the stack, the signature of the new method is extended in order to pass in the previous method's stack values as arguments. The signature of the newly constructed method comprises: the same parameters as the original method, followed by one argument for each local variable declared in the original method, followed by the values that were on the stack when the interpreter stopped interpretation.

Load instructions of the appropriate type (iload, fload, aload, etc.) push these values onto the stack. If the stack depth was "X" when the interpreter stopped interpreting the original method, then at the beginning of the new method, there will be "X" instructions to push the correct values onto the stack. For example, if the i-th stack entry, $S_i$, is of type "int", then the following bytecode is needed: iload <one of the new parameters>.

FIG. 10B shows similar elements with similar reference numerals to FIG. 10A. Method 1000 contains long-running loop 1002. Method 1000 is an example of a method constructed according to the process of the present invention. The newly created method also has the backward jump of the long-running loop, i.e. statement 1004, whose target is "label_i." At the beginning of method 1000, which is the newly constructed method, bytecodes 1010–1014 are added to reproduce exactly the state of the Java stack frame. The load instructions of the appropriate type (Xload=iload, fload, aload, etc.) push these values onto the stack. The process shown in FIG. 10B of pushing the previous state values onto the stack provides a mechanism for ensuring that the exact state of the stack, i.e. state variables "S" in methodState(S, V, L, M), are preserved between the previous interpreted method and the newly constructed method.

Figure 11E:
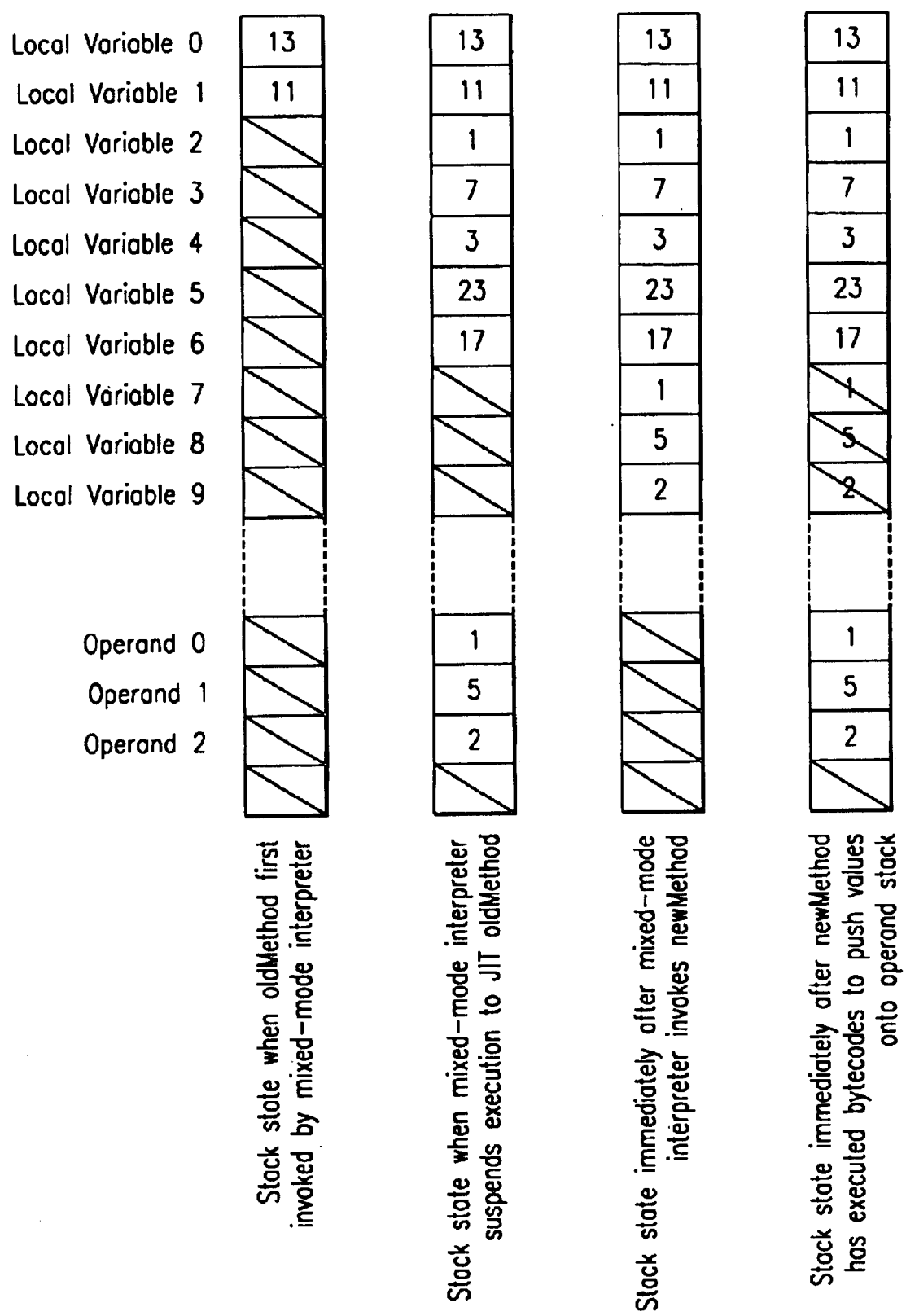

With reference now to FIGS. 11A–E, diagrams depict examples of a partially interpreted Java method that is being optimized by the process of the present invention, a newly constructed method, and the stack states at various points during the optimization process. FIG. 11A depicts the declaration of a method named "oldMethod", which has two parameters and contains a long-running loop that the mixed-mode interpreter of the present invention will attempt to optimize. FIG. 11B depicts the invocation of "oldMethod" from a calling method with two example values, 13 and 11. FIG. 11C depicts a representative declaration of a method named "newMethod" that is constructed according to the process of the present invention. In this example, in addition to two parameters, "oldMethod" has five local variables, all of type "int". The constructed method has the same parameters as the previous method that is being optimized plus additional parameters: a parameter for each local variable within the method being optimized, and a parameter for each value that is to be pushed onto the stack. In this example, at the moment the interpreter stops interpreting "oldMethod" and starts to construct "newMethod", the five local variables have values 1, 7, 3, 23, and 17, and that there are three values of type "int" on the JVM stack: 1, 5 and 2. FIG. 11D shows the invocation of the newly constructed method with values for the parameters that match the values retrieved from the previous stack frame of the method that is being optimized. FIG. 11E shows snapshots of the state of the current stack frame for "oldMethod" or "newMethod" at various points during the optimization process. After the stack values are pushed onto the operand portion of the stack, the locations within the local variables portion of the stack frame become undefined and available for other uses.

The above-described process already provides a mechanism for ensuring that any monitors held in its stack frame—state variables "M" in methodState(S, V, L, M), are preserved between the previous interpreted method and the newly constructed method. Monitors are constructs that provide thread synchronization associated with one or more sections of critical code that need to be executed as one indivisible operation.

If the thread executing the original method held any monitors when the interpreter stopped interpreting it, all of the monitors must be held during the process of generating, compiling and invoking the newly constructed method, lest other threads acquire them and change the state of the object they protect. Nothing else needs to be done in the new method that is constructed. If the thread was inside a synchronized block, execution will jump back inside that block when the JITed method resumes execution, and the monitor will be released when and if execution leaves the block. Similarly, a synchronized method will release its monitor when it exits. When invoking the new method, the process should not try to acquire the monitor, even if the original method was synchronized, because the thread already owns it.

The previously defined requirements, i.e. the requirements for the new method to behave as necessary so that the newly constructed method has an initial state and execution flow as the previous method, have been achieved with the above described process. With respect to the first requirement, after the stack variables have been pushed onto the stack and the "goto" bytecode has been executed, then the execution of the new method reaches the location of the looping label that is the target of the backward branch. With respect to the second requirement, when the execution of the new method first reaches the location of the looping label that is the target of the backward branch, methodState(S, V, L, M) is reproduced exactly. No bytecodes are executed between the point at which the exact stack state is restored and the point at which the method performs the "goto" instruction, hence no bytecodes can disturb the state of the stack. With respect to the third requirement, once the new method reaches the location of the looping label that is the target of the backward branch, the execution flow follows the original bytecode sequence of the original method that is being JITed.

After the method is constructed, processing is identical to any other JIT optimization. The newly constructed method may be compiled by invoking the JIT compiler. All other JIT optimizations can be applied on this new method. The current stack frame is first removed. Then the compiled new method is invoked with certain values of the current execution state (local variables and stack items) as the actual parameters. The thread may then be executed.

Figure 12:
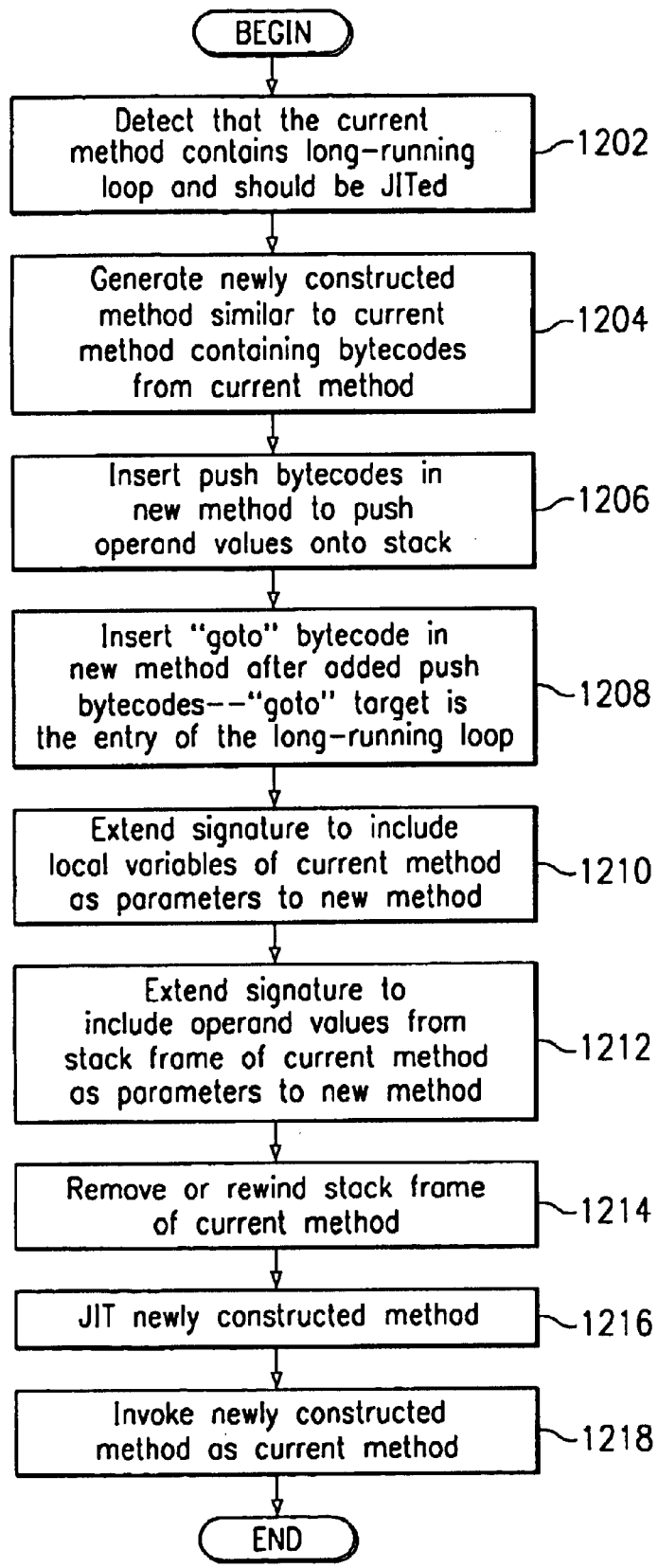
FIG. 12 is a flowchart depicting the overall flow of the optimization process for dynamically compiling a partially executed, interpreted method according to the process of the present invention.

With reference now to FIG. 12, a flowchart depicts the overall flow of the optimization process for dynamically compiling a partially executed, interpreted method according to the process of the present invention. The process begins when the mixed-mode interpreter within the JVM detects that the current method contains a long-running loop and should be JITed in order to enhance the processing speed of the method (step 1202). A new method is constructed that is similar to the current method by including the bytecodes of the current method into the newly constructed method (step 1204). Push bytecodes are then included in the new method for pushing operand values onto the operand portion of the stack frame (step 1206). A "goto" bytecode is included in the new method after the inserted push bytecodes with a destination location equal to the entry location of the long-running loop (step 1208). The signature of the new method is extended to include the local variables of the current method as parameters of the newly constructed method (step 1210). The signature of the new method is then extended to include the values of the operand portion of the current stack frame (step 1212). The current stack frame of the current method is removed (step 1214), and the newly constructed method is JITed (step 1216). The process ends with the invocation of the newly constructed method as the current method (step 1218).

It is possible that a method with long-running loops is invoked concurrently by many threads, all of which are in the interpretation mode, i.e. a multithreaded case. At the point in time when the interpreter decides to JIT a method, other threads may be executing the method with a different methodState(S, V, L, M). When the mixed-mode interpreter first JITs the method, a flag associated with the method may be set to indicate that the method has already been JITed. At any point that the interpreter executes a backward branch for the method of another thread, it checks this flag for the method it is interpreting. If the flag is set, the interpreter begins generating a new version of the method specific to this thread's state. The newly constructed method may then be; JITed and invoked without initiating another compilation of the original method, as was done for the first thread. It should be noted that it is not necessary to perform a compilation for each thread that is executing the method at the moment that the process decides to compile. Threads with identical operand stack configurations (same number and same type of values on the stack) and same "goto" target can use the same compiled version of "newMethod" because the operand stack configuration and "goto" target are the only possible differences between the various versions of "newMethod".

If a long-running loop occurs in an exception handler, then the approach of the present invention may be difficult to implement. For most applications, such a situation is an "exception." In such a case, the JVM may simply continue interpretation.

The advantages provided by the present invention should be apparent in light of the detailed description of the invention provided above. The present invention provides a method and apparatus for dynamically compiling a Java method that has been partially executed through interpretation. The purpose of the invention is to improve the performance of methods with long-running loops for which Java virtual machines with a mixed-mode of interpretation and JIT compilation cannot normally achieve adequate performance. The described method takes the following steps.

The first step of the present invention is to recognize methods with long-running loops. One solution is to introduce a counter to each Java method. The counter is initialized to 0 when the Java class containing the method is first loaded into the Java virtual machine. Each time a loop in a method is executed one iteration by the interpreter, the counter associated with the method is incremented by one. Once the counter reaches some predetermined number, e.g., 1,000,000, the process concludes that the method contains at least one long-running loop, and it becomes a candidate for application of the present invention. Those of ordinary skill in the art will appreciate that the method of recognizing methods with long-running loops may vary depending on the implementation.

Once a method is recognized as containing at least one long-running loop, the next step is to halt interpretation on the current thread, preserve the state of the virtual machine, construct a new method, and then compile the new method using the existing JIT compiler. The new method is constructed from the original method with two additions: (1) extra arguments that pass the current state of the virtual machine to the new method; and (2) extra bytecodes added to the beginning of the method to use the extra arguments to reproduce the virtual machine's state. The newly constructed method is then compiled by the JIT compiler. It is important to note that the newly constructed method in the present invention will always satisfy the following conditions: (1) the execution flow always reaches the point at which the interpreter stopped; (2) when the execution flow reaches the stop point, the original state of the virtual machine is exactly reproduced; and (3) once the execution flow reaches the stop point, it follows the original bytecode sequence of the original method.

Next, the current invocation frame of the interpreter is removed, and the new method's JIT compiled code is invoked. Control is then transferred from the interpreter to the JIT compiled code.

The present invention effectively solves the performance problem of methods with long-running loops. In addition, the present invention does not require changes to the JIT compiler; any JIT optimizations may still be applied to the new method as well as to the original method.

Mixed-mode interpreters that attempt to optimize hot spots within a Java program have had the disadvantage of requiring that a method that contains a hot spot must exit before the interpreter may JIT the method and improve its efficiency. The requirement that the method exit before it may be JITed poses a difficulty for methods that may have essentially non-terminating loops, such as loops in a daemon thread. The present invention detects these long-running loops and provides a method for terminating the interpretation of the method and initiating the construction of a new method that, when invoked with the proper parameters, will reach an execution state that is identical to the execution state of the previously, partially interpreted method. The present invention not only improves the performance of an interpreted Java program but also improves its speed on-the-fly.

It is important to note that while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such as floppy disks, a hard disk drive, RAM, CD-ROMs, and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A process for executing a method, the process comprising the computer-implemented steps of:
   during execution of an interpreted method, determining to compile the interpreted method;
   constructing a second method;
   compiling the second method; and
   invoking the second method so that an execution state of the interpreted method is recreated.

2. A process for executing a method, the process comprising the computer-implemented steps of:
   during execution of an interpreted method, determining to compile the executing interpreted method;
   compiling a second version of the executing interpreted method; and
   replacing the interpreted version of the executing interpreted method with the second version of the executing interpreted method while preserving the execution state of the executing interpreted method.

3. A process for executing a method, the process comprising the computer-implemented steps of:
   during execution of a first method through interpretation of a first set of bytecodes, determining that the first method satisfies predetermined criteria for compilation of the first method;
   halting the execution of the first method, wherein the first method is halted in a first execution state;
   constructing a second method comprising a second set of bytecodes;
   compiling the second method; and
   invoking the second method so that, during execution of the second method, the first execution state of the first method is recreated.

4. The process of claim 3 wherein determining a satisfaction of predetermined criteria for compilation further comprises determining that a method comprises an execution loop that has been executed for at least a predetermined number of times.

5. The process of claim 3 wherein an execution state for a method comprises:
   a set of local variable values within a stack frame for a method;
   a set of operand values within a stack frame for a method; and
   an execution location at a particular bytecode within a set of bytecodes for a method.

6. The process of claim 3 wherein the second set of bytecodes comprises:
   the first set of bytecodes;
   a set of bytecodes for pushing data values onto an operand portion of a stack frame; and
   a bytecode for branching to an execution location at which the interpretation of the first method was halted.

7. The process of claim 3 wherein the step of compiling the second method comprises just-in-time compiling the second method.

8. A process for executing a method, the process comprising the computer-implemented steps of:
   during execution of a first method through interpretation of a first set of bytecodes, determining that the first method satisfies predetermined criteria for compilation of the first method;
   halting the execution of the first method, wherein the first method is halted in a first execution state;
   constructing a second method comprising a second set of bytecodes;
   compiling the second method; and
   invoking the second method so that, during execution of the second method, the first execution state of the first method is recreated, wherein determining a satisfaction of predetermined criteria for compilation further comprises:
   comparing an execution statistic for a method against a predetermined value; and;
   determining that a method is a candidate for compiling if the execution statistic for a method is within a specified range of the predetermined value.

9. The process of claim 8 wherein an execution statistic comprises a count of the number of times that a backward branching instruction has been executed within a method.

10. The process of claim 9 wherein the interpretation of the first method is halted immediately before an execution of a backward branching instruction.

11. A process for executing a method, the process comprising the computer-implemented steps of:
   during execution of a first method through interpretation of a first set of bytecodes, determining that the first method satisfies predetermined criteria for compilation of the first method;
   halting the execution of the first method, wherein the first method is halted in a first execution state;
   constructing a second method comprising a second set of bytecodes;
   compiling the second method; and
   invoking the second method so that, during execution of the second method, the first execution state of the first method is recreated, wherein invoking the second method comprises invoking the second method with a set of parameter values, wherein the set of parameters values comprises:
   a set of original parameter values for the first method; and
   a set of parameter values equal to a set of operand values within a stack frame for the first method when the interpretation of the first method was halted.

12. A system for executing a method, the system comprising:
   determining means for determining to compile an interpreted method during execution of the interpreted method;

constructing means for constructing a second method;
compiling means for compiling the second method; and
invoking means for invoking the second method so that an execution state of the interpreted method is recreated.

13. A system for executing a method, the system comprising:
    means for determining to compile an executing interpreted method during execution of an interpreted method;
    compiling means for compiling a second version of the executing interpreted method; and
    replacing means for replacing the interpreted version of the executing interpreted method with the second version of the executing interpreted method while preserving the execution state of the executing interpreted method.

14. A system for executing a method, the system comprising:
    determining means for determining that a first method satisfies predetermined criteria for compilation of the first method during execution of a first method through interpretation of a first set of bytecodes;
    halting means for halting the execution of the first method, wherein the first method is halted in a first execution state;
    constructing means for constructing a second method comprising a second set of bytecodes;
    compiling means for compiling the second method; and invoking means for invoking the second method so that, during execution of the second method, the first execution state of the first method is recreated.

15. The system of claim 14 wherein the determining means for determining a satisfaction of predetermined criteria for compilation further comprises means for determining that a method comprises an execution loop that has been executed for at least a predetermined number of times.

16. The system of claim 14 wherein an execution state for a method comprises:
    a set of local variable values within a stack frame for a method;
    a set of operand values within a stack frame for a method; and
    an execution location at a particular bytecode within a set of bytecodes for a method.

17. The system of claim 14 wherein the second set of bytecodes comprises:
    the first set of bytecodes;
    a set of bytecodes for pushing data values onto an operand portion of a stack frame; and
    a bytecode for branching to an execution location at which the interpretation of the first method was halted.

18. The system of claim 14 wherein the compiling means for compiling the second method comprises means for just-in-time compiling the second method.

19. A system for executing a method, the system comprising:
    determining means for determining that a first method satisfies predetermined criteria for compilation of the first method during execution of a first method through interpretation of a first set of bytecodes;
    halting means for halting the execution of the first method, wherein the first method is halted in a first execution state;
    constructing means for constructing a second method comprising a second set of bytecodes;
    compiling means for compiling the second method; and
    invoking means for invoking the second method so that, during execution of the second method, the first execution state of the first method is recreated, wherein the determining means for determining a satisfaction of predetermined criteria for compilation further comprises:
    comparing means for comparing an execution statistic for a method against a predetermined value; and
    determining means for determining that a method is a candidate for compiling if the execution statistic for a method is within a specified range of the predetermined value.

20. The system of claim 19 wherein an execution statistic comprises a count of the number of times that a backward branching instruction has been executed within a method.

21. The system of claim 20 wherein the interpretation of the first method is halted immediately before an execution of a backward branching instruction.

22. A system for executing a method, the system comprising:
    determining means for determining that a first method satisfies predetermined criteria for compilation of the first method during execution of a first method through interpretation of a first set of bytecodes;
    halting means for halting the execution of the first method, wherein the first method is halted in a first execution state;
    constructing means for constructing a second method comprising a second set of bytecodes;
    compiling means for compiling the second method; and
    invoking means for invoking the second method so that, during execution of the second method, the first execution state of the first method is recreated, wherein the invoking means for invoking the second method comprises second invoking means for invoking the second method with a set of parameter values, wherein the set of parameters values comprises:
    a set of original parameter values for the first method; and
    a set of parameter values equal to a set of operand values within a stack frame for the first method when the interpretation of the first method was halted.

23. A computer program product in a computer-readable medium for use in a data processing system for executing a method, the computer program product comprising:
    first instructions for determining to compile an interpreted method during execution of the interpreted method;
    second instructions for constructing a second method;
    third instructions for compiling the second method; and
    fourth instructions for invoking the second method so that an execution state of the interpreted method is recreated.

24. A computer program product in a computer-readable medium for use in a data processing system for executing a method, the computer program product comprising:
    first instructions for determining that a first method satisfies predetermined criteria for compilation of the first method during execution of a first method through interpretation of a first set of bytecodes;
    second instructions for halting the execution of the first method, wherein the first method is halted in a first execution state;
    third instructions for constructing a second method comprising a second set of bytecodes;
    fourth instructions for compiling the second method; and
    fifth instructions for invoking the second method so that, during execution of the second method, the first execution state of the first method is recreated.

* * * * *

UNITED STATES PATENT AND TRADEMARK OFFICE
CERTIFICATE OF CORRECTION

PATENT NO.         : 6,851,109 B1
APPLICATION NO. : 09/306190
DATED                  : February 1, 2005
INVENTOR(S)        : Alexander, III et al.

It is certified that error appears in the above-identified patent and that said Letters Patent is hereby corrected as shown below:

On Title page, Col. 1,
Item [75} Inventors: delete "William Presten Alexander, III" and insert --William Preston Alexander, III--.

Col. 18, line 29: after "and" delete ";".

Signed and Sealed this

Eighteenth Day of July, 2006

JON W. DUDAS
*Director of the United States Patent and Trademark Office*